June 11, 1963 R. G. MATHIE 3,093,028
SELF-DRILLING AND SELF-TAPPING THREADED FASTENER
Filed Feb. 5, 1959

INVENTOR.
RICHARD G. MATHIE
BY
ATTORNEY

United States Patent Office 3,093,028
Patented June 11, 1963

3,093,028
SELF-DRILLING AND SELF-TAPPING THREADED FASTENER
Richard G. Mathie, Canal Fulton, Ohio, assignor to Eaton Manufacturing Company, Cleveland, Ohio, a corporation of Ohio
Filed Feb. 5, 1959, Ser. No. 791,386
1 Claim. (Cl. 85—41)

This device relates to a self-drilling, self-tapping type threaded fastener wherein means is provided to penetrate the material into which the fastener is to be applied and a cutting portion is also provided which removes material as the fastener is positively rotated and thus furnishes a pilot hole for the tapping portion and threaded shank of the fastener.

Devices of the class described and heretofore known either require a pilot hole into which the fastener is disposed or if a drilling portion is provided, the formation will withstand only nominal axial pressure due to the relatively small cross-sectional area near the tip with respect to the cross-sectional area of the threaded portion. In known construction, if the tip is of sufficient cross-sectional area, there is not sufficient room provided for the discharge of material removed from the hole and the loading on the cutting edge cannot attain a magnitude sufficient to remove material.

It is an object of this invention to provide a self-drilling and self-tapping screw wherein no pre-drilled pilot hole is needed in the material in which the fastener is to be applied.

A further object is to provide a self-drilling screw having a drilling tip portion which will withstand sufficient applying force to drill metals, fibers, plastic, wood and other materials ordinarily requiring a pre-drilled pilot hole.

Yet another object is to provide a self-drilling, self-tapping screw which does not lead off and yet will remove material at a rate depending on the axial force applied to the screw.

Still another object is to provide a fastener having a drilling tip with an optimum cutting angle and of a configuration which tends to lead into the material to be removed and thus remove material at a steady rate and form a smooth, circular hole.

These and other objects and advantages will become more apparent from the following detailed description of the device and from the accompanying drawings wherein.

Figure 1:
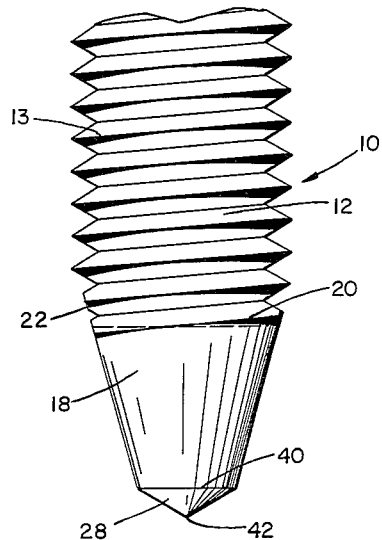
FIGURE 1 is a fragmentary side elevation view of a novel self-drilling, self-tapping fastener.
Figure 2:
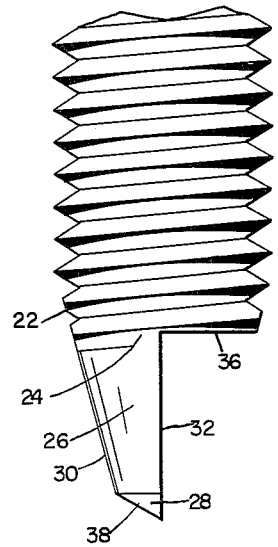
FIGURE 2 is a fragmentary side elevation view of the fastener disclosed in FIGURE 1 displaced 90° therefrom.
Figure 4:
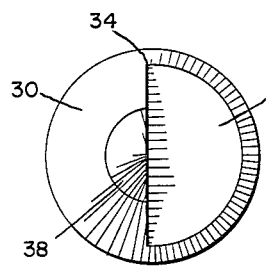
FIGURE 4 is a view from the tip of the fastener.
Figure 3:
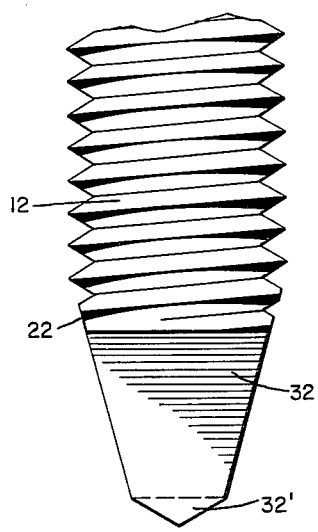
FIGURE 3 is a fragmentary side elevation view of a fastener disclosed in FIGURE 1 displaced 180° therefrom.
Figure 5:
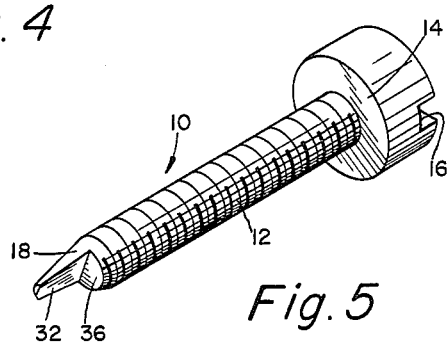
FIGURE 5 is a perspective view of the fastener.

Referring to the drawing for a detailed description of the device, a self-drilling, self-tapping screw 10 is provided with a threaded shank portion 12 and helically cut threads 13 formed thereon. This portion is illustrated as a constant diameter shank but it is to be understood that the shank can be conically tapered and such a formation is within the scope of equivalents relating hereto.

A suitable head portion 14 is provided with a driving slot 16 adapted to receive a manual or power screw driver (not shown). Obviously, a recessed socket head, a cap screw head, a square head, a hex head or other conventional screw head formation can be utilized without departing from the scope of this invention.

Referring now to the novel portion of this screw fastener, a drilling tip portion generally designated as 18 is broadly similar to a two quadrant segment of a cone and is joined integrally with shank 12 by a self-tapping portion 20 which is shaped generally as a frusto-conical part and is provided with threads 22 which function as the hole tapping threads.

The drilling tip portion 18 is comprised of a base 24, a main body portion 26 and a punch point 28 integral with the body portion 26. A lateral surface portion 30 extends continuously from the upper extremity of tapping portion 20 to the base of punch point 28 and is formed as a circumferential segment of a frusto-conical lateral wall. This surface is inclined at an angle in the range of 12° to 15° from the axis of the screw.

A planar surface portion 32 is disposed parallel to the axis of the screw and extends from the tip of punch point 28 to the lower extremity of the self-tapping portion 20. This distance measured axially is substantially equal to the nominal diameter of shank 12. This dimension has been found to be somewhat critical because if the drilling tip is substantially longer with respect to the shank diameter, main body portion 26 of the tip is weakened and the optimum angular range of surface 30 with respect to the axis of the screw cannot be maintained. Conversely, if the drilling tip is substantially shorter with respect to the shank diameter, the angular disposition of surface 30 with respect to the axis of the screw is too great.

It is also to be noted that planar surface 32 is specifically located with respect to the axis of the screw. The distance measured normal to the axis of the shank portion from surface 32 is equal to a dimension in the range of from 1% to 4% of the nominal screw shank diameter. It is obvious therefore, that surface 32 and lateral surface 30 lie on the same side of the shank axis. The planar surface 32 extends generally laterally and longitudinally continuously throughout the full extent of the respective part of the drilling portion 18 of the device and intersects the arcuate lateral surface 30 at laterally opposed locations therealong with one of the locations defining a cutting edge 34, this arrangement insures that a line drawn tangent to the cutting edge 34, formed by the intersection of lateral surface 30 and planar surface 32, always forms an angle with planar surface 32 less than 90° and therefore, the cutting edge is, in effect, provided with sufficient clearance. A flat surface portion 36 is disposed in a generally laterally extending plane that is preferably normal to the longitudinal axis of the device to define the lower surface of the tapping portion. The angle of the flat surface portion 36 with respect to the axis of the shank is not extremely critical but this surface is preferably disposed normal to the shank axis with the planar surface 32 intersecting the flat surface portion 36 so that the laterally opposed extremities of such intersection are disposed equidistant from the punch point 28.

Punch point 28 is formed integral with the tip of main body portion 26 and is comprised of a lateral surface portion and a planar surface portion 32' which is coplanar with and forms an extension of surface 32. A second lateral surface 38 of punch point 28 is formed at a constant angle with the axis of the shank and is in the range of 55° to 60° with respect to the shank axis. Base portion 40 of punch point 28 bears a dimensional relation with respect to the nominal screw diameter. Referring to FIGURE 1, 40 forms the base of a triangle having an apex 42. Base 40 is of a dimension equal to 45% to 48% of the nominal diameter of shank 12.

When screw 10 is to be applied to two or more sheets or thicknesses of material, the screw is rigidly held at the head portion by a suitable driver and point 42 is positioned at the exact location to which the fastener is to be applied. Sufficient axial force is applied to the screw to sink punch point 28 into the material while the screw is being rotated. Punch point 28 has sufficient drilling action to enter the material and when this entry is completed, the lower extremity of the drilling tip main body portion 26 begins a drilling action as the screw is rotated, due to cutting edge 34 removing material and discharging the removed particles, shavings or chips out through the cut away part of the tip. This drilling action continues until the lower end of self-tapping portion 20 comes into contact with the wall surface of the hole drilled by tip 18. The tapping threads function in a conventional manner and commence tapping the hole with threads of increasing depth as the screw moves further into or through the material.

Finally, threads 13 on shank 12 come into contact with the drilled, tapped hole and the screw is rotated into the material until the underside of head 14 contacts the surface of the drilled material, or as far as desired.

An important aspect of this invention is that by providing a drilling portion which is shaped essentially as a bisected half of a cone, a component of force normal to the axis of the screw tends to force cutting edge 34 into the material to be removed and thus aids in the cutting action.

Also, by disposing planar surface 32 in laterally spaced relation with the axis of the screw, a tangent to the arcuate surface portion 30 at the line of intersection with surface 32, always defines an angle of less than 90° with planar surface 32. This arrangement insures that less axial force is required to attain the same depth of cut but the clearance angle is still sufficient to prevent biting and digging by the drilling portion.

A novel threaded fastening means has been described herein which does not require any special tools for application of the fastener and which does not require any pre-drilled hole in the material to which the fastener is to be applied. The combined operations of drilling and tapping are successively performed by this novel device in a single inserting operation.

While the present invention has been described in connection with certain specific embodiments it is to be understood that the foregoing description is merely exemplary and that the concept of this invention is susceptible of numerous other modifications, variations, and applications which will be apparent to persons skilled in the art. The invention is to be limited, therefore, only by the broad scope of the appended claim.

I claim:

An elongate self-drilling and self-tapping fastener device having an externally threaded elongate shank portion terminating in a punch point which defines an end portion of the device, said shank portion having a tapping portion and a drilling portion formed integral with and disposed intermediate the tapping portion and the punch point of the device, said drilling portion extending generally longitudinally from the tapping portion toward the punch point a distance substantially equal to the nominal diameter of the shank portion, said tapping and drilling portions having a susbtantially frusto-conical configuration with the tapping portion being externally threaded and terminating in a flat surface disposed in a laterally extending plane which is normal to the longitudinal axis of the device, and the drilling portion being defined by a substantially smooth laterally arcuate surface which extends generally longitudinally from the tapping portion toward the punch point with the radii of the drilling portion decreasing to dispose the arcuate surface at an angle of from 12° to 15° relative to the longitudinal axis of the device and a substantially planar surface disposed generally parallel to the longitudinal axis of the device in spaced relationship relative thereto a distance of from 1% to 4% of the nominal diameter of the shank portion, said planar surface being disposed to the same side of the longitudinal axis of the device as the arcuate surface and extending generally laterally throughout the full extent of that part of the device which defines the drilling portion and intersecting the arcuate surface at laterally opposed locations therealong with one of such locations defining a cutting edge having an angle of less than 90° measured relative to the planar surface and a tangent of the arcuate surface at the cutting edge with the planar surface also intersecting the flat surface of the tapping portion with the laterally opposed extremities of the intersection therebetween being equidistant from the punch point, said punch point having substantially a frusto-conical configuration defined by an extension of the planar surface of the drilling portion of the device and a substantially smooth laterally arcuate second surface which extends generally longitudinally away from the drilling portion with the radii of the punch point decreasing to dispose the second arcuate surface at an angle of from 55° to 60° relative to the longitudinal axis to the device, and said punch point and said drilling portion having a juncture the size of which is within the range of 45% to 48% of the nominal diameter of the shank portion.

References Cited in the file of this patent

UNITED STATES PATENTS

| | | |
|---|---|---|
| 385,088 | Benzie | June 26, 1888 |
| 1,408,793 | Anderson et al. | Mar. 7, 1922 |
| 1,867,526 | Anderson et al. | July 12, 1932 |
| 2,654,284 | Scherenell | Oct. 6, 1953 |
| 2,871,752 | Stern | Feb. 3, 1959 |

FOREIGN PATENTS

| | | |
|---|---|---|
| 615,225 | Great Britain | Jan. 4, 1949 |
| 633,938 | Great Britain | Dec. 30, 1949 |
| 690,269 | Great Britain | Apr. 15, 1953 |
| 1,143,802 | France | Apr. 15, 1957 |